Jan. 3, 1967 T. T. BROWN 3,296,491
METHOD AND APPARATUS FOR PRODUCING IONS AND
ELECTRICALLY-CHARGED AEROSOLS
Filed Sept. 19, 1961 3 Sheets-Sheet 1

INVENTOR
THOMAS TOWNSEND BROWN
BY Watson, Cole, Grindle & Watson
ATTORNEYS

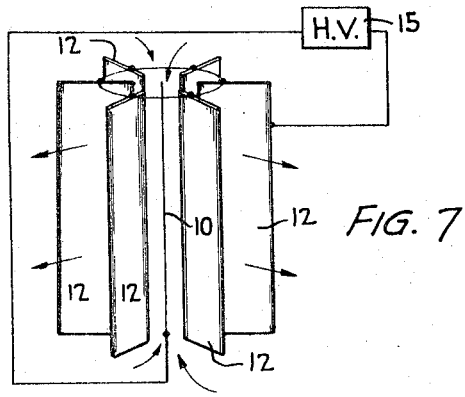
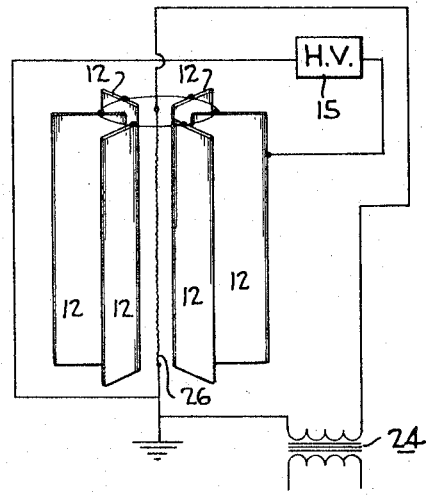
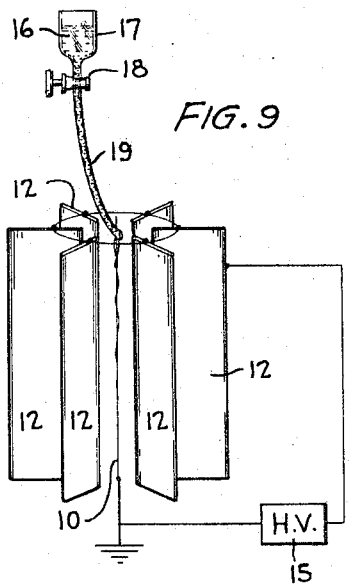
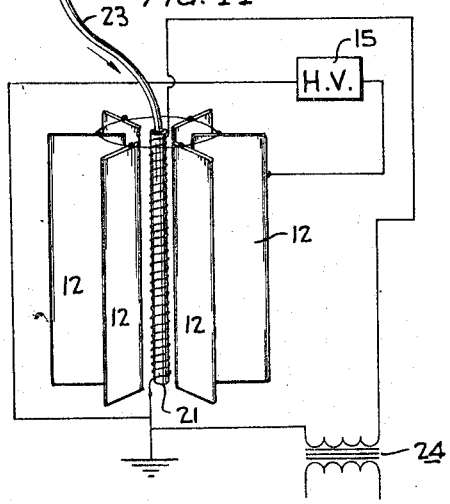
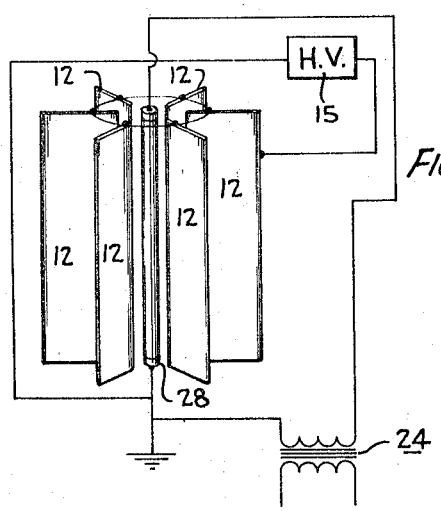
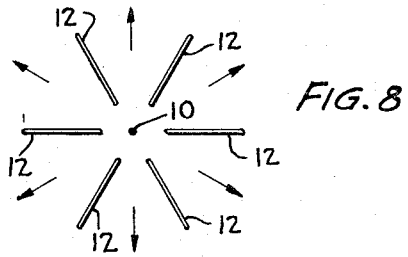

Jan. 3, 1967             T. T. BROWN            3,296,491
METHOD AND APPARATUS FOR PRODUCING IONS AND
ELECTRICALLY-CHARGED AEROSOLS
Filed Sept. 19, 1961                          3 Sheets-Sheet 3
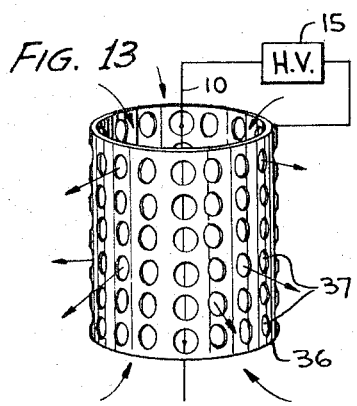
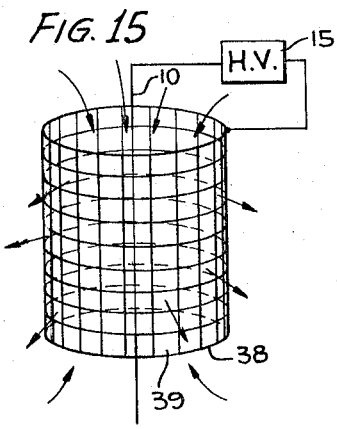
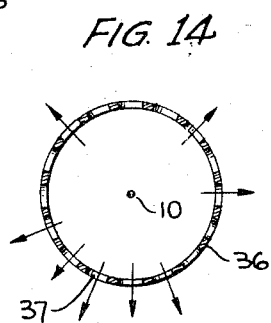
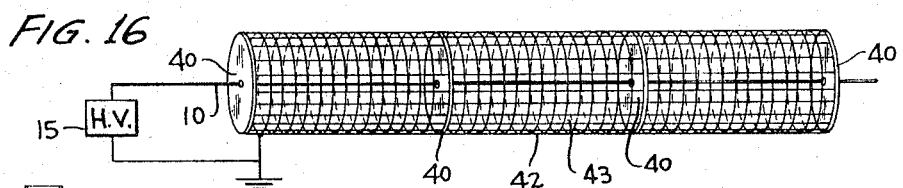
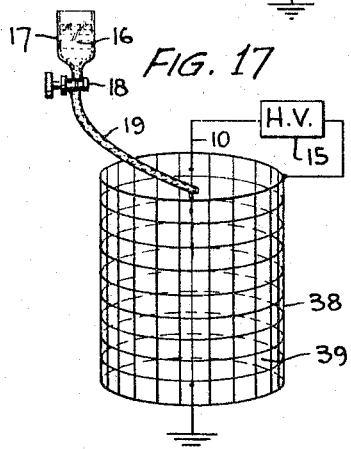
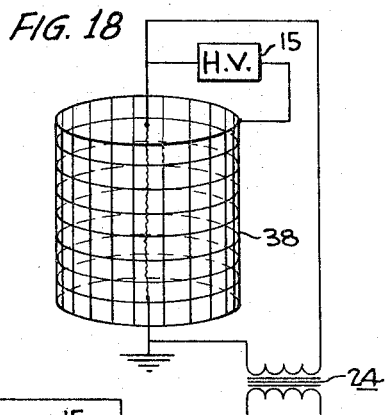
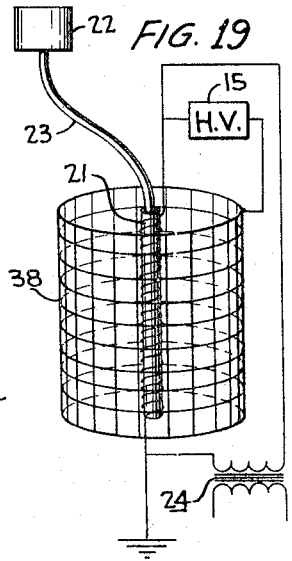
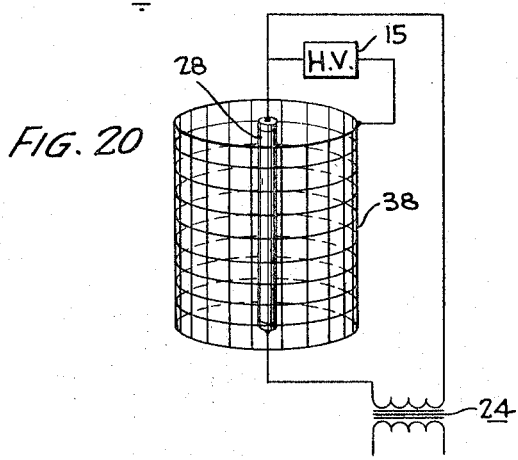
INVENTOR
THOMAS TOWNSEND BROWN
BY Watson, Cole, Grindle & Watson
ATTORNEYS

United States Patent Office 3,296,491
Patented Jan. 3, 1967

3,296,491
METHOD AND APPARATUS FOR PRODUCING IONS AND ELECTRICALLY-CHARGED AEROSOLS
Thomas Townsend Brown, Meadville, Pa., assignor, by mesne assignments, to Martin M. Decker, Montgomery County, Pa.
Filed Sept. 19, 1961, Ser. No. 139,830
14 Claims. (Cl. 317—3)

This application is a continuation-in-part of my issued patent entitled, "Electrokinetic Apparatus," 2,249,550, and applications entitled, "Electrohydrodynamic Fluid Pump and Electrokinetic Transducer," Serial Nos. 793,893 and 669,831, respectively.

In this invention, ionization and the charging of aerosols is accomplished by the use of high voltage, and, in special forms of the invention, by radioactive materials or ultra-violet light. The invention utilizes electrophoretic and electrohydrodynamic forces to generate ions and act upon the generated ions and electrically-charged aerosols to propel the same out of the generator into the surrounding medium. The principal feature of the invention, therefore, is the combination of: generation of ions or the charging of finely suspended matter, such as aerosols, and ejecting the same from the generator with substantial velocity into the surrounding medium.

The invention describes a novel form of reaction thrust producing device which causes a rapid flow of electrically-charged medium.

The invention utilizes divergent electric field-shaping, so as not only to create ions from the ambient medium and selected materials but selectively to propel unipolar ions out of the region of the generator.

It is an object of the invention to provide a method and apparatus for selectively charging and ejecting metal ions and massive aerosols useful in the production of thrust.

It is an object of the invention to provide means for selectively emitting positive or negative ions of atmospheric air for controlling ion-content in air conditioning, for hospital treatment rooms or the like, in the relief of asthma, thermal burns, etc., and in greenhouses for influencing plant growth and flowering.

It is another object of the invention to provide a means for atomizing and electrifying antibiotic liquids or other medications and for ejecting the same into the atmosphere of a hospital room or the like.

It is still another object of the invention to produce air clarification through electrostatic precipitation which results from the presence of a high concentration of aeroions, i.e., ions of atmospheric air produced by ionization of air, in a confined space. In this aspect, the invention contemplates the use of an ion-permeable covering on a high voltage coaxial cable, to eject unipolar ions into the surrounding air. A suggested application of such an ion-emitting "cable" is the reduction of smoke in long vehicular tunnels.

Generally, the invention contemplates the use of intense high voltage fields, ultra-violet or nuclear sources to produce the initial ionization.

The generated ions and electrically-charged aerosols are then, in effect, guided and propelled out of the emitter by shaped electrostatic fields. Such nonuniform fields produce forces not only upon the ions and aerosol particles but also upon the host medium.

In the present invention, the nonuniform fields are divergent fields. The divergent fields may be radial, wedge-shaped or conical. In such divergent fields, the ions are deflected, as well as accelerated, by electrophoretic forces. The effect commonly known as "ion-drag" also imparts momentum to the host medium.

In divergent fields, the host medium is additionally influenced by electrohydrodynamic forces and tends to flow in the direction of the divergence. This effect is also known as electrostrictive hydrodynamics.

The flow may be said to result from stresses in the dielectric medium as described by Sir James Jeans in "Mathematical Theory of Electricity and Magnetisum," page 177, published by the Cambridge University Press where $K$=dielectric constant of the medium
$R$=electric field density
$\tau$=density of the medium the stresses are as follows:

(1) $\quad \dfrac{KR^2}{8\pi}$ = tension along the lines of force (2)

$\dfrac{KR^2}{8\pi}$ = pressure perpendicular to the lines of force (3)

$\dfrac{R^2}{8\pi} = > \dfrac{\partial \kappa}{\partial \tau}$ hydrostatic pressure in all directions The host medium is the medium in which the emitter is operated. Usually, but not necessarily, the host medium is atmospheric air. A similar flow may be observed if the emitter is operated in other fluid dielectrics, such as transformer oil or gases at various pressures.

The two forces described above are influenced to some extent by a third force which is defined as dielectrophoretic. This force, also present in divergent fields, operates in the opposite direction and tends to move suspended polarized dielectric material from the peripheral electrode toward the central electrode of a radial generator, or generally, from the larger electrode to the smaller. The tendency of the dielectrophoretic force is to move the suspended material into the electric field, i.e., in the direction of convergence. It is observed in actual tests that dielectrophoretic forces in the present invention are relatively weak and usually are masked by the stronger electrophoretic (ion-drag) and electrohydrodynamic forces. Apparently, in the flat-vane and cylindrical emitters, subsequently described operation results entirely from electrophoretic and electrohydrodynamic forces.

Ionization which takes place near the smaller electrode is caused by the extremely high electric gradients in this region of the field. This ionization results from the stripping of electrons from air molecules and suspended fluid particles immediately adjacent to the electrode. The aeroions or aerosol particles acquire their charge principally in the region of the smaller electrode. Upon acquiring a charge, the majority of aeroions or charged aerosol particles follow the electric lines-of-force and move generally in the direction of the larger electrode but do not strike that electrode. In the case of the flat-vane ion generators, the observed flow pattern is first toward, then parallel to the surface of the larger electode and continues in a relatively straight line downstream from the electrode. In the case of cylindrical generators, the flow is radial toward the walls of the cylinder, then out through the electrode apertures. It is obvious that this flow pattern does not result from (nor entirely conform to) simple electostatic (Coulomb) attraction, and because of this peculiar behavior the electrohydrodynamic force (electrostrictive hydrodynamics) is apparently largely responsible for the observed flow.

Additional ionization in the region of the smaller electrode can be provided by a radiation source, such as an ultra-violet lamp or radioactive material. The lamp or radioactive source may itself take the place of the smaller electrode so as to be in the proper position to feed ions most effectively into the divergent electrostatic field. Where radioactive material is used, the smaller electrode is composed of, or coated with, said material.

Where heavy metal ions are desired, as in the production of thrust, the smaller electrode is again modified. In this instance, the electrode may take the form of an electrically-heated tube containing molten cesium or other ionized or ionizable material. The tube is formed of tungsten sponge or the like so as to be permeable to said molten material. Upon reaching the outer surface of the tube, unipolar ions of the material are caught in the divergent electric field and ejected toward and beyond the larger electrode by the combination of propulsive forces described above.

The foregoing discussion represents a possible explanation of the phenomenon accompanying the operation of this invention. The application of the method and the operation in its various geometric configurations are set forth in detail in the accompanying drawings, wherein:

FIGURE 7 is a combined block and perspective view of an ion-emission device similar to that shown in FIGURE 1 except that it utilizes an electrode formed of a number of vanes in radial array around an axially-located elongated central electrode.

FIGURE 8 is a plan view showing the flow pattern of the ion-emission and dielectric flow observed in the apparatus in FIGURE 7.

FIGURE 9 is a combined block and perspective view of apparatus similar to that of FIGURE 3a except utilizing an electrode comprising vanes in radial array for emitting charged aerosols.

FIGURE 10 shows a combined block and perspective view of apparatus of the same radial pattern as that of FIGURE 9 with an electrically-heated electrode similar to that shown in FIGURE 5.

FIGURE 11 is a combined block and perspective view of apparatus similar to that in FIGURE 4 except with radial electrodes.

FIGURE 12 shows a combined block and perspective view of apparatus similar to that of FIGURE 6 except with radial electrodes.

FIGURE 13 shows in perspective ion-emission apparatus similar to that of FIGURE 7 except for the substitution of an apertured cylindrical electrode in place of radial vanes.

FIGURE 14 is a plan view of the structure of FIGURE 13 showing the flow pattern of the device.

FIGURE 15 is a block and perspective view similar to that shown in FIGURE 13 except for the substitution of a screen or wire-mesh cylinder in place of the apertured electrode.

FIGURE 16 is a combined block and perspective view of an elongated ion-emission device similar to that shown in FIGURE 15. In this form, the device resembles a coaxial high voltage cable with an ion-permeable grounded screen covering.

FIGURE 17 is a combined block and perspective view of a charged aerosol emission device similar to that shown in FIGURE 9 except that it utilizes a screen-mesh cylinder in place of radial vanes.

FIGURE 18 shows a combined block and perspective view of a device utilizing a screen-mesh cylinder and serving essentially the same purpose as the radial vane device of FIGURE 10.

FIGURE 19 is a combined block and perspective view of an emission device with screen-mesh electrode serving the same purpose as that shown in FIGURE 11.

FIGURE 20 illustrates in combined block and schematic form the use of an axially located ultra-violet lamp within a screen-mesh electrode serving essentially the same purpose as that form of the invention illustrated in FIGURE 12.

Figure 1:
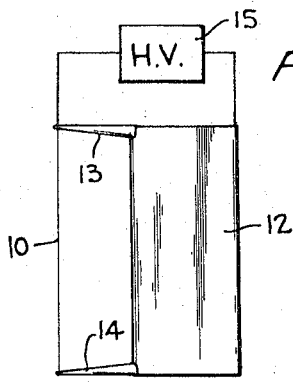
FIGURE 1 is a combined block and side elevational view illustrating diagrammatically a simple form of ion-emission apparatus embodying and functioning in accordance with the principles of this invention.

Referring in detail to the drawings, I have illustrated in FIGURE 1 a simple structure comprising elongated electrode 10 attached to an edge of flat vane electrode 12 by standoff insulators 13 and 14. Electrode 10 may take the form of a fine wire, rod or tube of small diameter. Electrode 12 may take the form of a flat plate or streamlined fin. The two electrodes are maintained at different electrical potentials by high voltage power supply 15. The polarity may be reversed in order to reverse the polarity of the generated ions, but such reversal does not change the direction of flow either of the ions or the ambient medium. This basic structure is the same as that illustrated in two of the reference patents of which this is a continuation-in-part.

Figure 2:
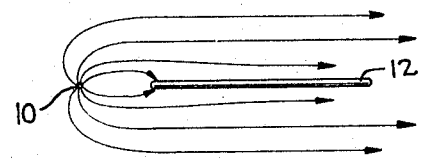
FIGURE 2 is a plan view of the apparatus shown in FIGURE 1 showing the flow pattern of the ion emission produced. Generally the same flow pattern is established in the fluid dielectric in which the apparatus is operated.

FIGURE 2 is a plan view of electrodes 10 and 12 showing the flow pattern of the ambient medium. It is to be noted that the flow is first divergent from the smaller electrode 10, then generally parallel to the surface of electrode 12 and projecting downstream therefrom in straight lines. The charged ambient medium in the region of electrode 10 is accelerated first toward, then beyond, electrode 12, so that the device, in effect, serves both as an ionizer and a thrust producing device.

When operating in atmospheric air, the device shown in FIGURE 1 emits aeroions into the downstream region. As a generator and emitter of aeroions it is found to be an effective device, operating in the range of 10 to 70 kilovolts when a fine tungsten or stainless steel wire is used as electrode 10. Ozone is created by the intense electric discharge in the higher voltage ranges. If, for any reason, the output of ozone is objectionable, a rod-shaped electrode $\frac{1}{16}$ to $\frac{1}{2}$ inch or more in diameter, may be used. When this is done, voltages in excess of 70 kilovolts may be employed, with attendant increased pumping speed and the production of a larger volume of ionized air, without increasing the ozone content. In air conditioning, a small amount of ozone is not objectionable—its presence tends to deodorize or sweeten the air.

Figure 5:
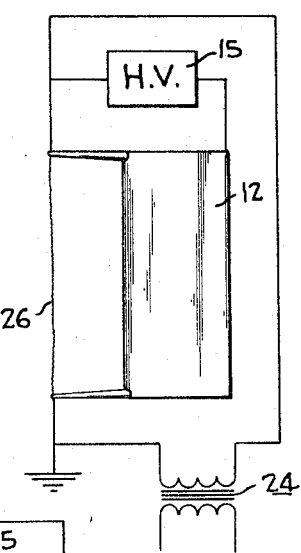
FIGURE 5 is a combined block and side elevational view of the apparatus shown in FIGURE 1 with means for electrically heating the elongated electrode by a filament transformer.

Clinical applications of this device are usually directed to the production of aeroions. In such application, it is important to avoid the use of electrode materials which could produce toxic metal ions. Metals such as stainless steel, chromium or nickel are preferred. In certain instances, special chemical electrode coatings may be used. Sometimes these are employed to facilitate electron emission (to improve ionization) or to produce specific ions for biochemical reactions. In this event, coatings of thorium oxide, barium chloride or the like may be applied to the electrode surfaces. Increased electron emission, to achieve greater ionization, can be accomplished by resistance-heating of the smaller electrode through the use of a filament heating transformer (as shown in FIGURE 5).

Figure 3A:
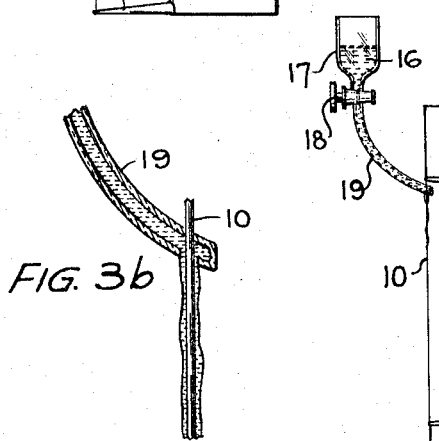
FIGURE 3a is a combined block and side elevational view illustrating diagrammatically a simple linear form of apparatus for emitting electrically-charged aerosols.

In FIGURE 3a, a device for atomiziing and emitting electrically-charged aerosols is illustrated. Selected liquid 16 is placed in reservoir 17. The flow of liquid to the atomizer-emitter is controlled by valve 18, thence passes through small tube 19 to produce a more or less uniform envelope flowing downward around electrode 10. In the intense electrostatic field around electrode 10, this envelope of liquid is rapidly dispersed and the charged droplets follow the flow pattern indicated in FIGURE 2. The highly-charged aerosol thus is ejected unidirectionally out of the emitter into the ambient air. The emitter itself experiences a reactive mechanical force in the opposite direction.

Figure 3B:
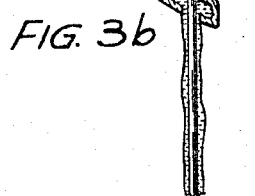
FIGURE 3b is an enlarged view partly in section of the end of the tube where the liquid is applied to the small electrode.

FIGURE 3b is an enlargement of the portion of the emitter where the liquid envelope around electrode 10 is formed. It consists of small tube 19, surrounding electrode 10 at the orifice of the tube. It is to be noted that, in the operation of the device shown in FIGURE 3a, electrode 10 may be grounded, hence permitting liquid to be added to reservoir 17 or adjustments made of flow by valve 18 without danger of electric shock to the operator. The polarity of the power supply is reversible so that aero-ions and aerosols bearing either positive or negative charges may be emitted.

To a certain extent, colloidal solutions, emulsions and finely divided solid suspensions may also be charged and emitted into the surrounding air. In general, it is observed that liquids of low surface tension are more readily atomized.

In certain instances, it is found to be advantageous to substitute a wick in place of filiform electrode 10 or, alternatively, to sheath a wire electrode with wicking. The purpose is to more effectively conduct the liquid medium into the dispersing (atomizing) region. This type of atomizing results from the strong outward surface forces tending to "explode" liquids adhering to an electrode in the region of intense electrostatic fields.

Multiple units of the device shown in FIGURE 3a may be employed to increase the volume of aerosol emission or to provide mixtures of aerosols. Such multiple units are conveniently arranged in side-by-side array (not illustrated).

Figure 4:
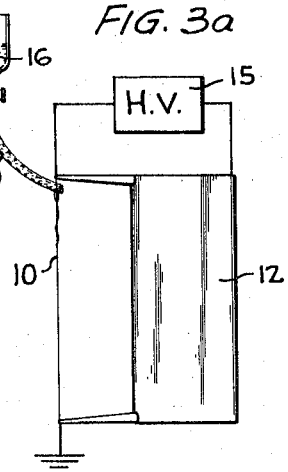
FIGURE 4 is a combined block and elevational view partly in section of apparatus for emitting ions of preselected materials contained within an electrically-heated semipermeable tube.

FIGURE 4 is a device for ionizing and emitting cesium or other ionizable material. It consists of a semi-permeable tube 21 formed of tungsten sponge or the like containing molten cesium or other ionizable material. In this embodiment of the invention, a supply of expendable ionizable material 20 is maintained in reservoir 22 and conducted to the interior of tube 21 by pipe 23. Tube 21 is electrically-heated by filament transformer 24. A high electrical potential difference is maintained between tube 21 and plate 12 by high voltage power supply as indicated. Molten cesium, penetrating the walls of tube 21, wets the surface of the tube and is simultaneously vaporized and thermally ionized in the region of the intense electrostatic field surrounding said tube. Unipolar ions are accelerated by the field and ejected toward and beyond electrode 12. The vigorous ejection of these massive ions by the electrode system produces a mechanical reaction tending to move the system as a whole in the opposite dierction. Whereas, in FIGURE 4 only one pair of electrodes is illustrated, it is to be understood that pairs of electrodes may be assembled in multiple parallel array to increase the ion emission and resultant thrust.

In FIGURE 5, the filiform electrode 26 is coated with readily thermally ionizable material. Electrode 26 is heated by transformer 24 to produce thermions which leave electrode 26 and follow the pattern indicated in FIGURE 2.

Figure 6:
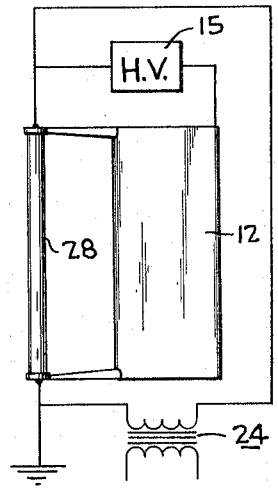
FIGURE 6 is a combined block and elevational view of a similar structure in which an elongated ultra-violet lamp serves as one of the two electrodes of an ion-emitting device.

FIGURE 6 shows a structure similar to those shown in preceding figures except that an elongated ultra-violet lamp 28, such as a quartz-tube mercury vapor lamp, is substituted for electrode 10. The lamp constitutes an electrode corresponding to electrode 10 in FIGURE 1. In this embodiment of the invention, ultra-violet lamp 28 is energized by transformer 24. One side of the lamp can be grounded (as indicated), or the lamp can be made the highly charged electrode with electrode 12 grounded; in which case transformer 24 would have its secondary highly insulated from ground. Ultra-violet radiation from lamp 28 ionizes the air or other medium in the immediate vicinity of the lamp. Unipolar ions are selectively propelled by the field toward and beyond electrode 12, as indicated by the flow pattern of FIGURE 2.

FIGURE 7 illustrates a modification of the basic geometry shown in FIGURE 1 and illustrates an alternative structure wherein there are a number of radially aligned interconnected vanes 12, arranged around central electrode 10. Potential difference is applied between the central electrode and the system of radial vanes by power supply 15 as indicated. Ions and charged medium are ejected radially outward as shown by the arrows. Inflow of medium occurs at each end near the axis.

FIGURE 8, a plan view, indicates by arrows the radial flow pattern of the ions and charged medium described above. The radial electrodes 12, as well as the electrodes 12 (in FIGURES 1 to 6 inclusive) may be in the form of flat metallic plates or vanes, or their cross-sections may be tear-drop shaped or their surfaces faired or streamlined to improve aerodynamic form as well as to create improved electric field shaping. Forces equivalent to those shown in FIGURE 1 act upon the unipolar ions and the host medium in the central region and propel the same radially outward through vanes 12 and into the surrounding region.

FIGURE 9 shows an aerosol-emission device basically similar to that shown in FIGURE 3a, except that the emission is radially outward in all directions. Electrode 10, in the form of a fine wire or rod, with or without a wick casing, is kept moist by liquid 16 from the reservoir 17 with valve 18 similar to that described in FIGURE 3a. Aerosol droplets of the applied liquid are electrostatically torn from electrode 10 and projected radially outward between vanes 12 at substantial velocities.

FIGURE 10 shows a structure similar to that of FIGURE 5 except that the flow is radially outward in all directions.

FIGURE 11 illustrates apparatus similar to that shown in FIGURE 4 except that the emission is radially outward in all directions. The form of the invention shown in FIGURE 11 cannot be utilized, by itself, as a method of thrust production. It can be utilized, however, as an ion generator in combination with other accelerating fields. In other words, cesium ion emission by the device shown in FIGURE 11 is radially symmetrical and no thrust whatever results. Only by applying this form of emitter for use with external electrostatic fields (not illustrated) can this particular form of device become a component part of a thrust production system.

FIGURE 12, using ultra-violet lamp 28, illustrates a radial ion-emitting device basically similar to the emitter shown in FIGURE 6. This embodiment of the invention is useful for producing small aeroions for biochemical or therapeutic effects.

In FIGURE 13, there is an alternative modification of the peripheral electrode. In this embodiment of the invention, an apertured cylinder 36 replaces the radial vanes 12, shown in FIGURES 7 to 12. The potential difference between central electrode 10 and cylinder 36 is maintained by power supply 15 as indicated. Ionization takes place in the vicinity of electrode 10 and unipolar ions are selectively accelerated toward cylinder 36. Electrohydrodynamic forces operating within the divergent electrostatic field, as described above, cause both the unipolar ions and the host medium to be deflected through apertures 37 and radially outward into the ambient medium. Inflow of medium is present along the axis from either end. The plan view of the flow pattern is shown in FIGURE 14.

In FIGURE 15, the apertured cylinder 36 (in the previous drawing) is replaced by a wire-mesh cylinder 38 containing open spaces 39 similar to the apertures 37 of the previous drawing. The device generates and produces a flow of unipolar ions and host medium outward through the mesh openings and into the ambient region as previously described.

In FIGURE 16 a special structure, similar in appearance to a coaxial high voltage cable is illustrated. Basically similar to that form of device shown in FIGURE 15, it is designed to emit unipolar ions for use in such applications as the clarification of air and the reduction of smoke in long vehicular tunnels. This embodiment of the invention utilizes a central filiform electrode 10 coaxially positioned by insulated spacers 40 within wire-mesh cylindrical electrode 42. Electrodes are maintained at a potential difference by the power supply as shown. For safety in operation, the cylindrical electrode 42 may be grounded. As is the case with that form of device shown in FIGURE 15, ionization takes place in the region of filiform electrode 10, and unipolar ions are selectively accelerated by the field toward electrode 42. Deflection takes place causing them to be ejected through mesh openings 43 and outward into the surrounding air. In this case, the host medium within the device does not flow, for the reason that intake is precluded by the closed ends and by disc-shaped insulating baffles 40. In certain cases where it is desirable that the host medium be permitted to flow, baffles may be perforated and special intake joints and open-ended couplings may be added.

The purpose and operation of the device shown in FIGURE 17 is the same as that of the device shown in FIGURE 9. Wire-mesh electrode 38 serves the same function as radial vanes 12 and emission of charged aerosols takes place through the wire-mesh openings 39.

FIGURES 18, 19 and 20 show devices equivalent to those shown in FIGURES 10, 11 and 12, respectively, with screen-mesh cylinders 38 alternative to radial vanes 12.

In most of the figures, the smaller of the two principal electrodes is shown as connected to the ground. It is to be understood, however, that so far as operability of the invention is concerned, either electrode may be grounded or neither may be grounded. The ground connection is used for safety, to simplify circuits or facilitate handling. If the emitter bceomes a component of thrust production system, connection to the vehicle frame is satisfactory.

I claim:

1. Apparatus for producing electrically-charged aerosols comprising a first electrode and neighboring second electrode of larger size, said electrodes being stationary relative to each other, means for applying an ionizable liquid stream to the surface of said first electrode and means for applying a direct current potential difference between said first and second electrodes whereby ions are produced from said liquid stream and are swept from said first electrode beyond said second electrode by the electrostatic force resulting from said potential difference.

2. Apparatus according to claim 1 in which said first electrode is rod-shaped.

3. Apparatus according to claim 1 in which said second electrode is cylindrical and perforated.

4. Apparatus according to claim 1 wherein said first electrode is a liquid-conducting wick.

5. Apparatus according to claim 1 including means to regulate the flow of said liquid stream.

6. Apparatus according to claim 1 in which said second electrode has a faired surface.

7. Apparatus consisting of multiple pairs of electrodes according to claim 1, interconnected and arranged in a parallel array.

8. Apparatus according to claim 1 including a second electrode having a number of interconnected vanes in radial array with respect to a centrally located first electrode.

9. Apparatus according to claim 1 in which said second electrode is cylindrically shaped and said first electrode is coaxial with respect to said second electrode.

10. Apparatus according to claim 9 in which said second electrode is an apertured cylinder.

11. Apparatus according to claim 9 in which said second electrode is a cylindrically-shaped screen.

12. A method of electrically-charging and propelling a dielectric liquid relative to a system of electrodes comprising the steps of forming said system of a pair of electrodes of different size, said electrodes being stationary relative to each other, introducing an ionizable liquid onto the smaller of said pair of said electrodes, immersing said electrodes in said liquid and supplying said electrodes with a direct current potential difference wherein said fluid is propelled from one of the electrodes of said pair beyond the other electrode of said pair, whereby said liquid is ionized and said ions are swept from said first electrode beyond said second electrode by the electrostatic force resulting from said direct current potential difference.

13. Apparatus for generating and emitting ions comprising a first and a second electrode including an elongated first electrode substantially parallel to an edge of a relatively flat second electrode of a larger area than said first electrode, said electrodes being substantially coplanar, said elongated electrode being a semi-permeable tube, ionizable material in said tube, means for applying a direct current potential difference to said electrodes, a reservoir of ionizable material and means for conveying said material from said reservoir to the interior of said tube.

14. Apparatus for generating ions comprising a first and a second electrode including an elongated first electrode co-axial with a cylindrical perforated second electrode including means for applying a direct current potential difference to said electrodes, said elongated electrode being a permeable tube, ionizable material in said tube, a reservoir containing a supply of ionizable material and means for conveying said material from said reservoir to the interior of said tube.

References Cited by the Examiner

UNITED STATES PATENTS

| | | | |
|---|---|---|---|
| 2,333,842 | 11/1943 | Cascio et al. | 250—43 |
| 2,639,972 | 5/1953 | Hicks | 250—43 |
| 2,802,446 | 8/1957 | Utterback | 239—15 |
| 2,827,394 | 3/1958 | Sherman | 238—15 |
| 2,934,648 | 4/1960 | Leupi | 317—4 |
| 2,949,550 | 8/1960 | Brown | 310—5 |
| 2,968,719 | 1/1961 | Haberle et al. | 250—43 |
| 3,018,394 | 1/1962 | Brown | 310—5 |
| 3,050,652 | 8/1962 | Baldwin | 313—63 |
| 3,052,088 | 9/1962 | Davis et al. | 313—63 |
| 3,085,749 | 4/1963 | Schweitzer et al. | 239—15 |

MILTON O. HIRSHFIELD, *Primary Examiner.*

SAMUEL BERNSTEIN, *Examiner.*

R. V. LUPO, *Assistant Examiner.*